United States Patent [19]

Baillargeon et al.

[11] Patent Number: 5,588,969
[45] Date of Patent: Dec. 31, 1996

[54] METHOD FOR SUPPLYING PHOSPHOROUS VAPOR

[75] Inventors: James N. Baillargeon, Springfield; Alfred Y. Cho, Summit, both of N.J.

[73] Assignee: Lucent Technologies Inc., Murray Hill, N.J.

[21] Appl. No.: 412,678

[22] Filed: Mar. 29, 1995

[51] Int. Cl.$^6$ .............................. B01D 7/00; C01B 25/02
[52] U.S. Cl. ........................................ 23/294 R; 423/322
[58] Field of Search ............................ 423/322; 23/294 R

[56] References Cited

U.S. PATENT DOCUMENTS 4,618,345  10/1986  Kuck et al. .............................. 423/322

FOREIGN PATENT DOCUMENTS 1107651  5/1961  Germany .............................. 23/294 R
143705  9/1980  Germany .............................. 423/322

Primary Examiner—Wayne Langel

[57] ABSTRACT

In accordance with the invention, phosphorous vapor is provided by in situ conversion of red phosphorous to white phosphorous and permitting the flow of vapor from said white phosphorous. The conversion is effected in a low pressure cell having a high temperature region for evaporating red phosphorous and a low temperature region for condensing the resulting vapor into white phosphorous. At room temperature equilibrium, the vapor pressure is dominated by the white phosphorous.

9 Claims, 2 Drawing Sheets

METHOD FOR SUPPLYING PHOSPHOROUS VAPOR

FIELD OF THE INVENTION

This invention relates to a method and apparatus for supplying phosphorous vapor. More specifically it provides phosphorous vapor from white phosphorous produced in situ from red phosphorous.

BACKGROUND OF THE INVENTION

Phosphorous vapor is needed in the fabrication of a variety of high performance electronic and optoelectronic devices. The vapor is used in the growth of semiconductors such as indium phosphide and in the doping of semiconductors such as silicon. It is difficult, however, to provide a safe, reliable source of phosphorous vapor.

At ordinary temperatures and pressures phosphorous exists in two dominant allotropes: white phosphorous ($\alpha$-white) and amorphous red phosphorous. White phosphorous is difficult to store and use because it is highly volatile and highly flammable. Red phosphorous is more stable, but of limited use as a vapor source because it provides an erratic equilibrium vapor pressure when heated. The resultant unstable vapor pressure generates a beam flux which is unsuitable for the growth or doping of semiconductors. Accordingly, there is a need for a safe, reliable source of phosphorous vapor.

SUMMARY OF THE INVENTION

In accordance with the invention, phosphorous vapor is provided by in situ conversion of red phosphorous to white phosphorous and permitting the flow of vapor from said white phosphorous. The conversion is effected in a low pressure cell having a high temperature region for evaporating red phosphorous and a low temperature region for condensing the resulting vapor into white phosphorous. At room temperature equilibrium, the vapor pressure is dominated by the white phosphorous.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graph, are not to scale.

DETAILED DESCRIPTION

Figure 1:
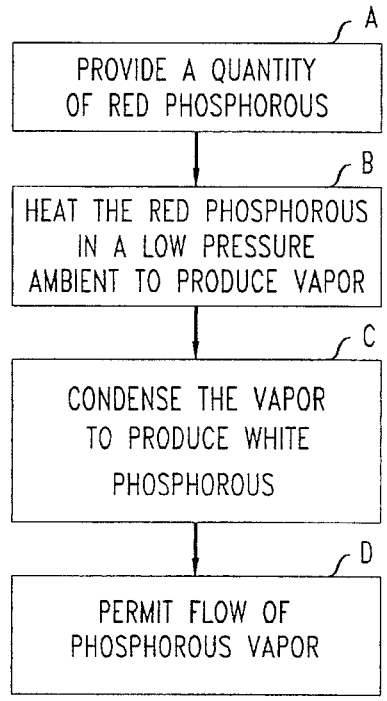
FIG. 1 is a block diagram of a method for supplying phosphorous vapor.

Referring to the drawings, FIG. 1 is a schematic block diagram showing the steps in generating a steady supply of phosphorous vapor. The first step shown in block A of FIG. 1 is to provide a quantity of red phosphorous.

The next step shown in block B is to heat the red phosphorous in a low-pressure ambient ($P \leq 10^{-3}$ Torr and preferably $P \leq 10^{-9}$ Torr) to produce phosphorous vapor. Red phosphorous has a low vapor pressure unless heated. When heated it provides vapor at an unstable vapor pressure unsuitable for many applications. Typically the red phosphorous is heated to a temperature $T \geq 200°$ C. and preferably $T \geq 300°$ C.

Figure 2:
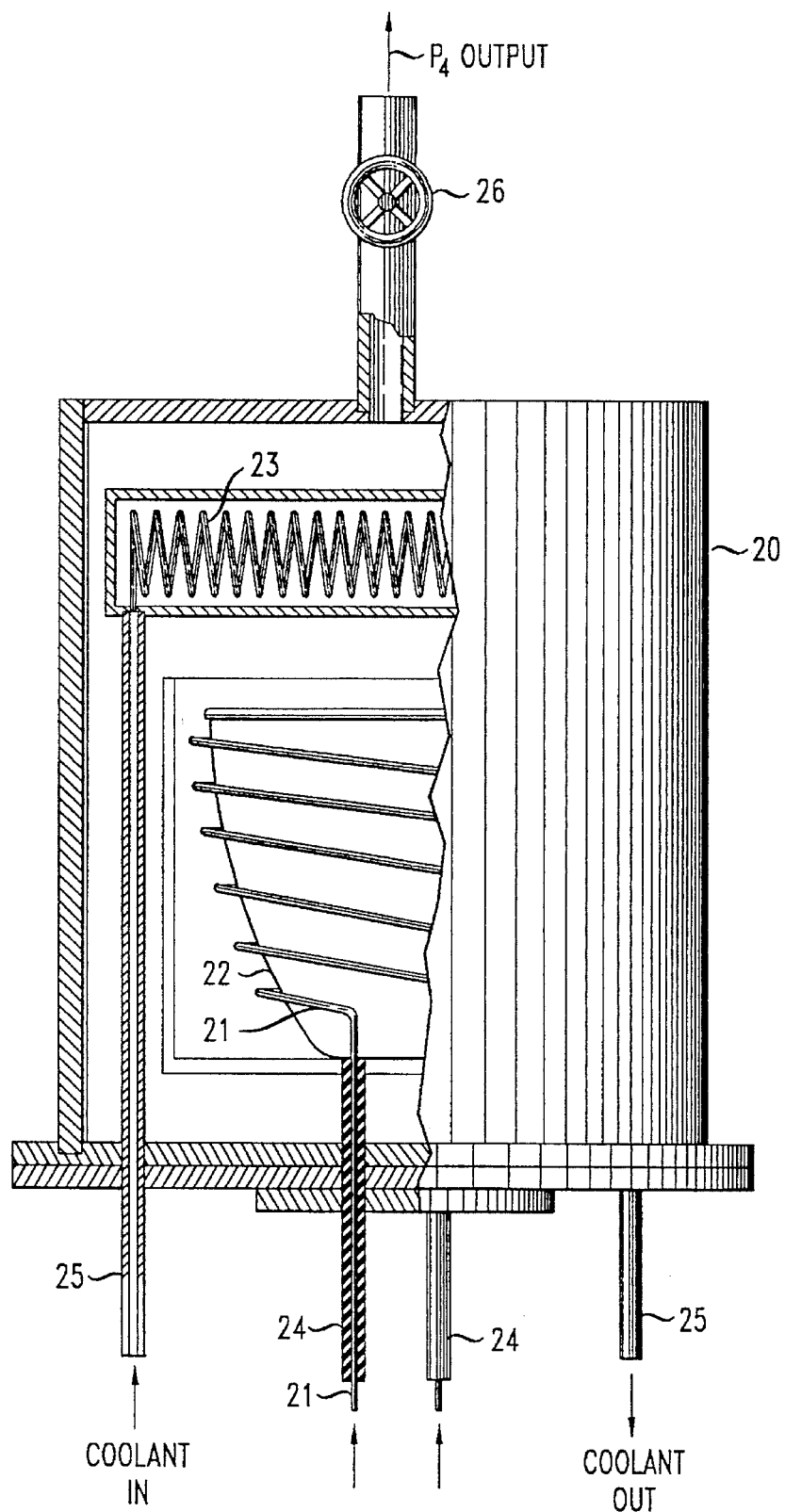
FIG. 2 is a schematic cross section of apparatus useful in practicing the method of FIG. 1.

Preferred apparatus for carrying out this step is the phosphorous cell shown in FIG. 2. In essence the cell comprises a sealed, evacuable vessel 20 including a heating unit such as resistive wire 21 for heating a crucible 22 of red phosphorous and a cooling unit such as a "cold finger" coil 23 for cooling phosphorous vapor emitted from the heated red phosphorous. The heating wires are conveniently powered by electrical feed-throughs 24, and the cooling unit 22 can be cooled by coolant feed-throughs 25. The coolant can be liquid, gas or liquified gas. A valve 26 is provided to permit the flow of phosphorous vapor from vessel 20.

The third step in block C of FIG. 1 is to cool the phosphorous vapor quickly in the low pressure ambient to condense white phosphorous. Quick cooling produces the white phosphorous allotrope rather than the red allotrope. The cooling region is at a temperature below 120° C. and preferably below 30° C.

Figure 3:
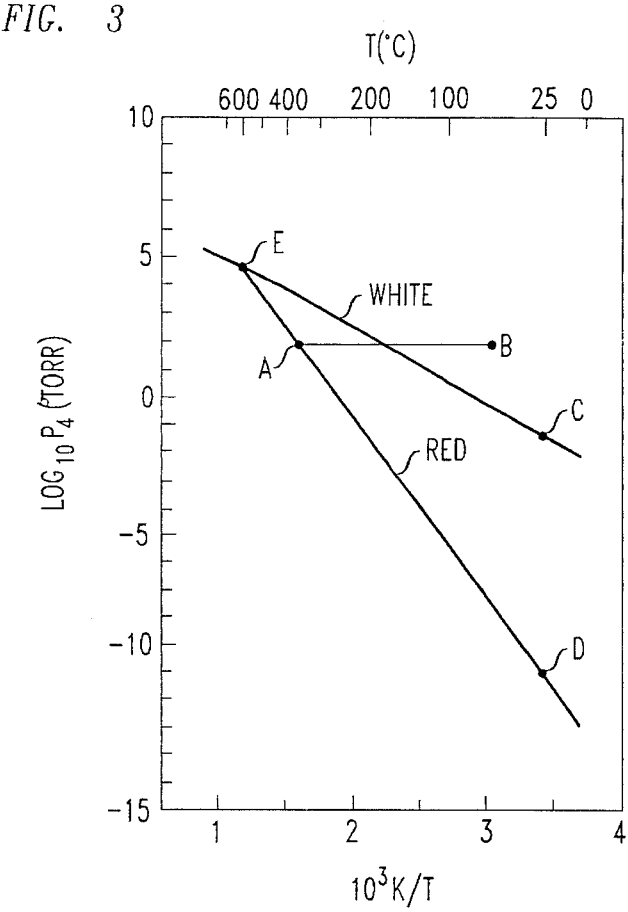
FIG. 3 is a phase diagram of red and white phosphorous useful in understanding the method of FIG. 1.

The effect of the second and third steps can be understood by reference to the phase diagram of FIG. 3. Because both heating and cooling units are contained within the same vessel, the equilibrium pressure is the same in both temperature regions. The vapor pressure therefore is restricted to horizontal movements in the phase diagram of FIG. 3. If the temperature of the heating region is $T_A$ and the temperature of the cooling region is $T_B$, the vapor pressure is restricted along the line A, B, and only the white allotrope will form.

The next step shown in FIG. 1, block D, is to permit a flow of phosphorous vapor from the condensed white phosphorous. When a desired amount of white phosphorous has accumulated on the cold finger unit, the cooling unit and the red phosphorous heating unit are turned off, and the system is permitted to return to ambient temperature (25° C.). At 25° C., the equilibrium $P_4$ vapor pressure of the white phosphorous dominates the vapor pressure inside the vessel. This can be seen by reference to FIG. 3 which shows the equilibrium $P_4$ vapor pressure of white phosphorous at point C eight orders of magnitude greater than the vapor pressure of red phosphorous at point D.

The equilibrium pressure of white phosphorous is sufficient that no heating beyond 25° C. is required for an adequate vapor supply for growth. At this temperature further phase transformations do not take place. The red and white forms separately coexist in thermodynamic equilibrium. The resultant $P_4$ vapor can be released upon demand via a control valve 26 in the vessel of FIG. 2. Optionally the $P_4$ vapor can be thermally dissociated into $P_2$ by passing it through a separate heating zone (not shown) to heat it typically above 750° C. and preferably above 850° C.

It is to be understood that the above-described embodiments are illustrative of only a few of the many possible specific embodiments of the invention. Numerous and varied other arrangements can be made by those skilled in the art without departing from the spirit and scope of the invention.

The invention claimed is:

1. A method for supplying phosphorous vapor comprising the steps of:

heating red phosphorous in a low pressure chamber to produce phosphorous vapor;

permitting said phosphorous vapor to directly flow into contact with a cooling unit in said low pressure chamber in order to quickly cool said vapor to selectively condense the white allotrope of phosphorous, and permitting a flow of phosphorous vapor from said white phosphorous allotrope.

2. The method of claim 1 wherein said red phosphorous is heated to a temperature $T_A \geqq 200°$ C.

3. The method of claim 1 wherein said red phosphorous is heated to a temperature $T_A \geqq 300°$ C.

4. The method of claim 1 wherein said red phosphorous is heated at an initial pressure $P \leqq 10^{-3}$ Torr.

5. The method of claim 1 wherein said red phosphorous is heated at an initial pressure $P \leqq 10^{-9}$ Torr.

6. The method of claim 1 wherein said phosphorous vapor is condensed by contact with a cool region having a temperature $T_B < 120°$ C.

7. The method of claim 1 wherein said phosphorous vapor is condensed by contact with a cool region having a temperature $T_B < 30°$ C.

8. The method of claim 1 wherein the temperature of said condensed white phosphorous is permitted to go to room temperature.

9. The method of claim 1 including the further step of dissociating the vapor from said condensed white phosphorous.

* * * * *